(12) United States Patent
Fry

(10) Patent No.: US 6,431,224 B1
(45) Date of Patent: Aug. 13, 2002

(54) CATALYST REMOVAL WORKSTATIONS AND SYSTEMS INCORPORATING SAME FOR TUBULAR REACTORS

(75) Inventor: Paul Fry, League City, TX (US)

(73) Assignee: Catalyst Services, Inc., La Porte, TX (US)

( * ) Notice: Subject to any disclaimer, the term of this patent is extended or adjusted under 35 U.S.C. 154(b) by 0 days.

(21) Appl. No.: 10/081,399

(22) Filed: Feb. 21, 2002

Related U.S. Application Data

(62) Division of application No. 09/776,316, filed on Feb. 2, 2001, now Pat. No. 6,360,786.

(51) Int. Cl.$^7$ .............................. B65B 31/00; B67C 3/00
(52) U.S. Cl. .................................. 141/8; 141/4; 141/65; 141/67; 141/91; 134/166 C; 134/169 C; 242/390.1; 15/345
(58) Field of Search ............................ 141/4, 8, 65, 67, 141/91, 92; 134/166 C, 169 R, 169 C; 242/389, 390, 390.1, 390.2, 390.8, 390.9; 15/315, 345

(56) References Cited

U.S. PATENT DOCUMENTS

| | | |
|---|---|---|
| 3,916,960 A | 11/1975 | Thompson |
| 4,820,496 A | 4/1989 | Sapoff |
| 5,222,533 A | 6/1993 | Porter, Jr. |
| 5,228,484 A | 7/1993 | Johnson |
| 6,145,517 A * | 11/2000 | Mancuso .................... 134/22.1 |
| 6,182,716 B1 | 2/2001 | Fry |

* cited by examiner

Primary Examiner—Timothy Maust
(74) Attorney, Agent, or Firm—Mark A. Oathout

(57) ABSTRACT

A system is used for removing catalyst from a tubular reactor vessel. A power box with a 110 volt to a 12 volt DC transformer is mounted outside the vessel and connected to a 110 volt power supply. An air manifold, also mounted outside the vessel, is connected to a high-pressure air supply and connects to several valves with a separate connection to the power box. Several workstations are placed on the tube sheet within the vessel. The workstation has a frame, a drum and reel assembly mounted on the frame along with a 12 volt DC motor. An air lance hose passes into the drum and reel assembly and, at the other end, connects to an air lance and vacuum assembly. A high pressure air hose connects the drum and reel assembly to one of the valves located outside of the vessel. A controller connects to the 12 volt DC motor to power the drum and reel assembly. The controller is also connected to the power box located outside the vessel and to a foot control. A seat is mounted on the drum and reel assembly.

11 Claims, 3 Drawing Sheets

CATALYST REMOVAL WORKSTATIONS AND SYSTEMS INCORPORATING SAME FOR TUBULAR REACTORS

This application claims the benefit of and is a division of U.S. patent application Ser. No. 09/776,316 filed Feb. 2, 2001 now U.S. Pat. No. 6,360,786.

BACKGROUND

The present invention relates to the field of catalyst reactors containing numerous reactor tubes within a vessel. For a general description of such an environment and related technologies see U.S. Pat. Nos. 5,228,484, and 5,222,533 and the patents discussed therein. U.S. Pat. No. 5,228,484, in particular discloses a reel system for breaking up and removing catalyst by a vacuum. This reel system is implemented by placing the drum outside the reactor vessel. The lance and nozzle are then run by a hose through a manway into the reactor vessel to a worker. There is also a line running to a control box for each worker. The workers inside the vessel normally sit on a plastic bucket when performing catalyst unloading operations within the vessel. As there may be several workers within the vessel unloading the catalyst from the tubes, there are numerous hoses and lines running into the reactor. If the hoses and/or lines become tangled the workers inside the vessel need to communicate the circumstances to workers located outside the vessel.

The control boxes used in the prior systems received a 110 volt power supply. For purposes of safety, it may not be desirable to have a 110 volt power supply located within a reactor vessel.

The reactor vessels have an opening or manway which can be of different sizes. However the opening is round. The manway may be at the top or on the side of the reactor vessel above the tube sheet. The largest manway to a reactor vessel of which the applicant is aware has a diameter of approximately thirty-six inches, and the manways to tubular reactor vessels have an opening ranging from a twenty to a thirty-six inch diameter. In some instances the reactor vessel has a flanged, removeable head around the perimeter of the reactor vessel itself (in which case the head of the vessel is removed to form the manway).

The prior reel systems have been made with a square outer casing which further suggests that such reel systems were not designed for implementation within the reactor vessel. Moreover, after the hose is reeled into a square or large casing, the stiffness of the hose (e.g. a plastic hose) causes the hose to spring back and expand away from the reel. In a square casing there is more room for the hose to spring back which leads to tangling of the hose on the reel.

SUMMARY

The present system, apparatus and methodology increase the efficiency of catalyst unloading operations in tubular reactor vessels by reducing worker fatigue, tripping hazards, electrical hazards and loss of operational time due to tangling of hoses.

A system is disclosed for removing catalyst from a tubular reactor vessel. A power box with a 110 volt to a 12 volt DC transformer is mounted outside the vessel and connected to a 110 volt power supply. An air manifold, also mounted outside the vessel, is connected to a high-pressure air supply and connects to several valves with a separate connection to the power box. Several workstations are placed on the tube sheet within the vessel. The workstation has a frame, a drum and reel assembly mounted on the frame along with a 12 volt DC motor. An air lance hose passes into the drum and reel assembly and, at the other end, connects to an air lance and vacuum assembly. A high pressure air hose connects the drum and reel assembly to one of the valves located outside of the vessel. A controller connects to the 12 volt DC motor to power the drum and reel assembly. The controller is also connected to the power box located outside the vessel and to a foot control. A padded swiveling seat is mounted on the drum and reel assembly.

DETAILED DESCRIPTION

Figure 1:
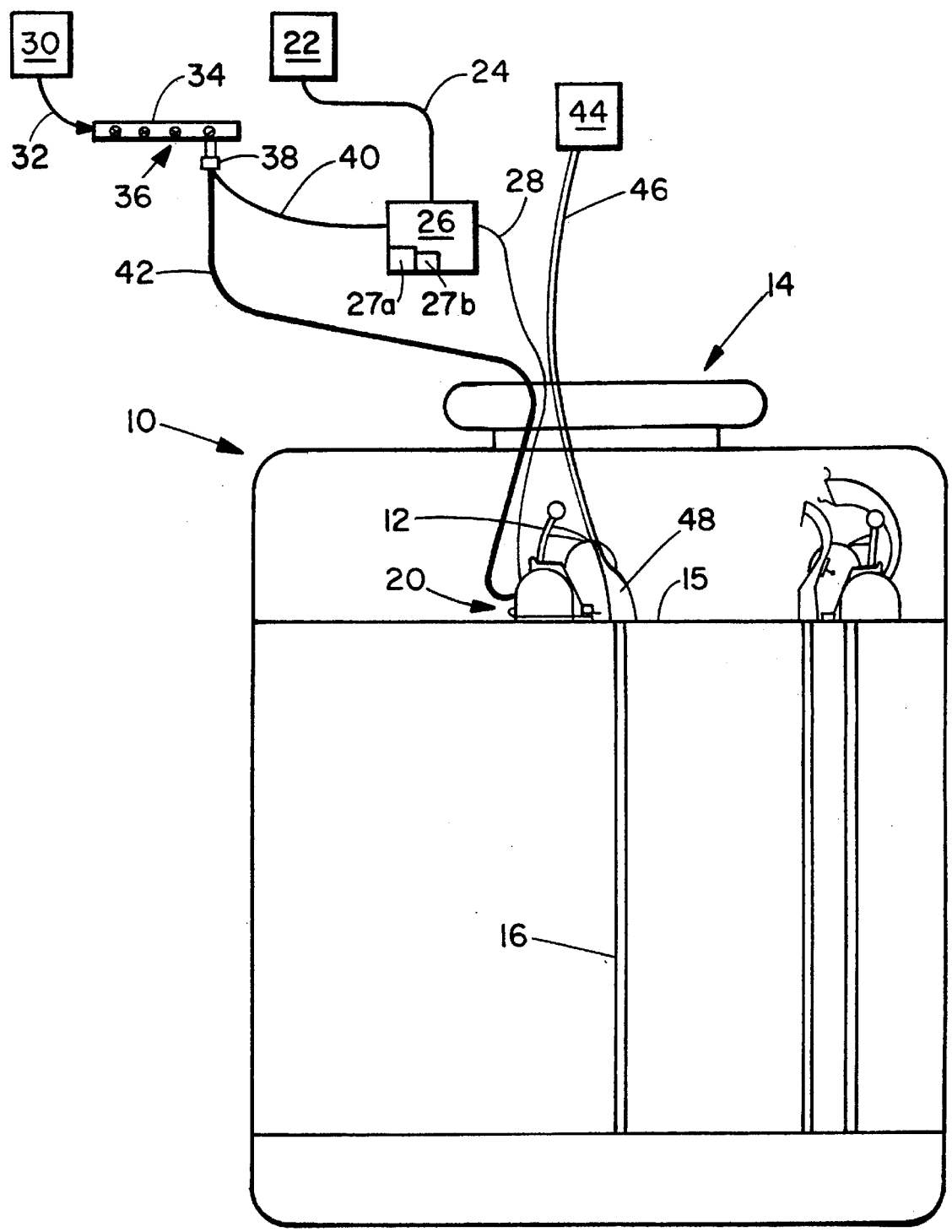
FIG. 1 represents an elevational schematic of a reactor vessel and the working system of the invention.

FIG. 1 represents a catalyst reactor vessel 10 with workers 12 performing a catalyst unloading operation. The vessel 10 has a manway 14 forming an opening to a tube sheet 15 which is a substantially flat perforated surface located at the upper end of numerous reactor tubes 16. The tubes contain catalyst to be removed by high-pressure air and a vacuum as known to one of ordinary skill in the art. The tubes 16 may have an inner diameter ranging from ¾ of an inch up to two inches and may be up to sixty feet long from top to bottom.

The workers 12 unloading the catalyst may be seated on the catalyst removal workstation 20. Outside the vessel 10 a 110 volt AC power supply 22, for example (although other voltages may be used), is connected by a line 24 to a power box 26 with a transformer 27a and an alternating current to a direct current converter circuit 27b, for example, a power box 26 which converts 110 volt AC to 12 volt DC. A low voltage DC line 28, which in the illustrated embodiment is 12 volts dc, runs from the power box 26 to the workstation 20. A high-pressure air supply 30, for example, at 300 psi is connected by a line 32 to an air manifold 34. The air manifold 34 has several connectors 36 for making a connection to a valve 38 such as a solenoid valve. The solenoid 38 is normally closed (and would not be operational with 12 volt DC power) and is connected by a 110 volt line 40 (although other voltages may be used) to the power box 26. A high pressure air hose 42 runs from the valve 38 through the manway 14 to the workstation 20. A vacuum source 44 is connected by a vacuum line 46 to a catalyst collection manifold 48 as known to one of ordinary skill in the art.

The line 28, hose 42 and hose 46 must all run through the manway 14 into the vessel 10 to support a single workstation 20. During normal catalyst unloading operations there are normally five to ten workstations 20 per reactor vessel 10 when performing catalyst unloading operations. Also, the five to ten workers may be working up to twelve to fourteen hours at a workstation 20 during catalyst unloading operations.

Figure 2:
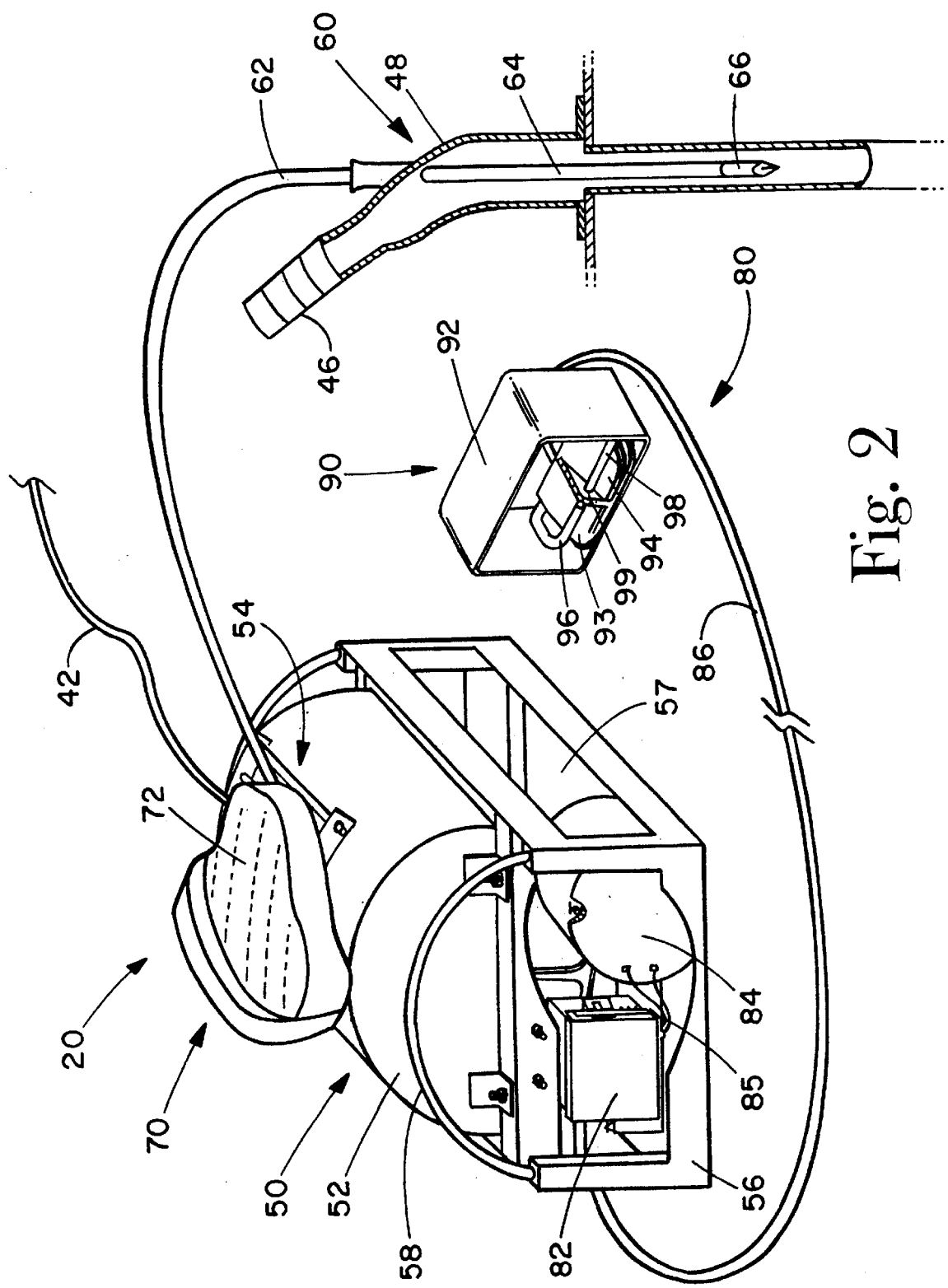
FIG. 2 is a perspective view of the workstation partially in cross-section.

Referring to FIG. 2 the ergonomic catalyst removal workstation 20 is shown. The workstation 20 is of a unitary construction and generally includes a drum and reel assembly 50, an air lance and vacuum assembly 60, a seat 70, and a control assembly 80.

The drum and reel assembly 50 has a hollow drum 52 which encloses a high-pressure hose reel (not shown) as known to one of ordinary skill in the art. The drum 52 has a hose guide or opening 53 through the sidewall of the drum 52 which may be about three inches by ten inches wide to assist in guiding the hose into and out of the drum 52. The drum 52 is mounted on a frame 56. The lower surface 57 of the frame 56 is adapted for maintaining stability on the tube sheet 15 in the vessel 10, e.g. a flat plate, as shown. Arcuate handles 58 which generally correspond to the curvature of the drum 52 are attached to the frame 56. The handles 58 may be used for carrying or moving the workstation 20. The air lance and vacuum assembly 60 includes a high-pressure air lance hose 62 which runs into the drum 52, raps around the reel and is connected to the high pressure air line 42 as known to one of ordinary skill in the art. The other end of the air lance hose 62 connects through the catalyst collection manifold 48 to a lance 64 and nozzle 66. The nozzle 66 has forward jets to fluidize the catalyst and backward jets to move the catalyst out of the tube 16. The catalyst collection manifold 48 is connected to a vacuum hose 46 for removing catalyst from the tube 16. The lance 64 may be moved up and down through a hole in the catalyst collection manifold 48.

Figure 3:
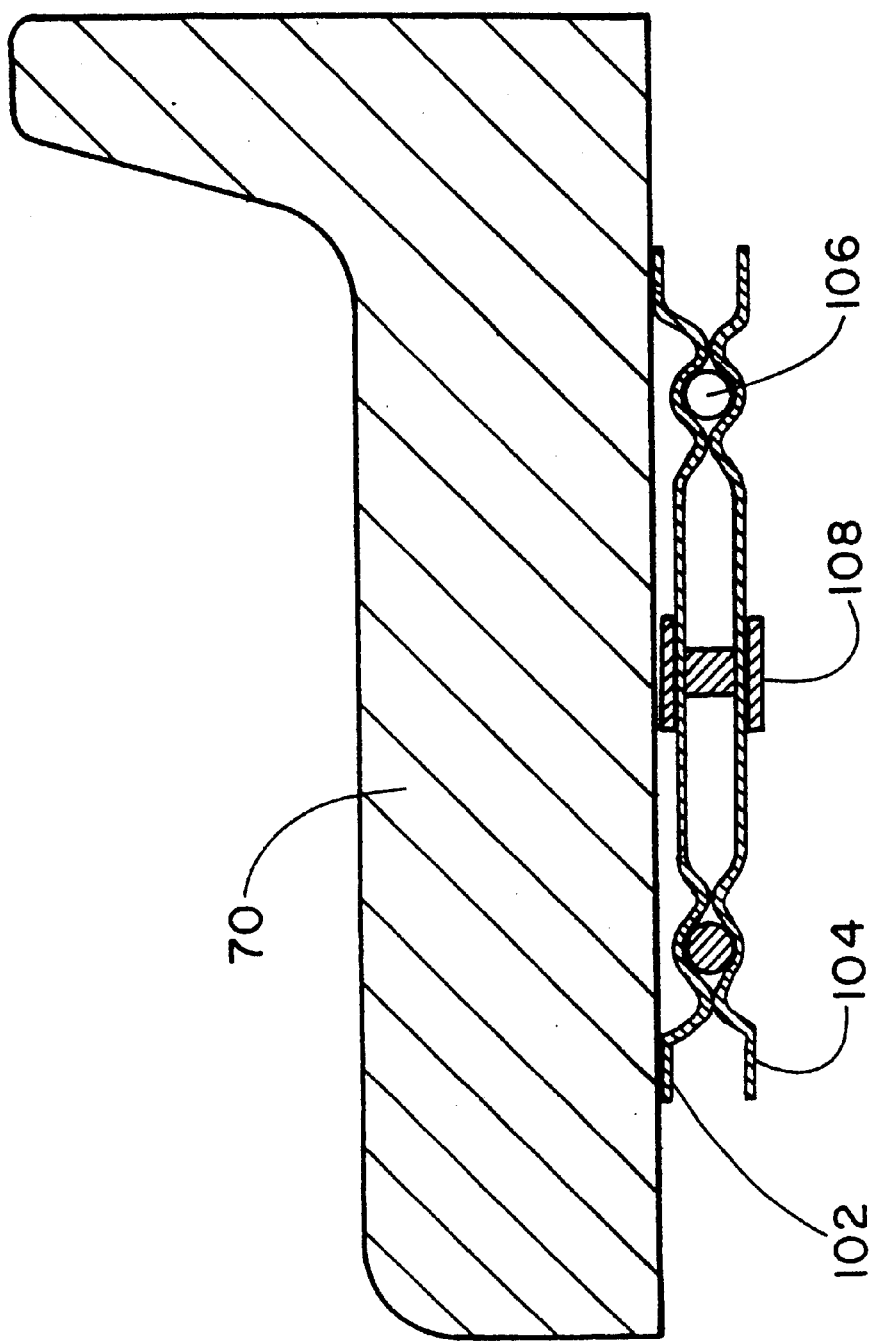
FIG. 3 is an elevational sectional view of the seat and swivel assembly.

The seat 70 is mounted on the drum 52 preferably through a swivel connection 100 (see FIG. 3). The swivel connection 100 includes a top plate 102 and a bottom plate 104 each defining a race for containing ball bearings 106. A rivet 108 holds the top plate 102 and the bottom plate 104 together. The top plate 102 is attached to the seat 70 and the bottom plate 104 is connected to the drum 52. Therefore a worker 12 may rotate to other tubes while sitting on the seat 70. The seat 70 preferably includes a padded cover 72 for reducing worker fatigue.

The control assembly 80 generally includes a controller box 82, a low voltage dc motor 84, which in the illustrated embodiment is a 12 volt dc motor, and a foot control 90. The low voltage line 28 runs through the manway 14 and connects to the controller box 82. The controller box 82 may be mounted on the frame 66. The low voltage motor 84 may also be mounted on the frame 66. Low voltage such as 12 volt dc power lines 85 run from the controller box 82 to the low voltage motor 84. The low voltage motor 84 is used to reel up the air lance hose 62 into the drum and reel assembly 50 by, e.g. a belt drive pulley or a gear to gear system. Note, the air lance hose 62 is normally hand pulled for extending same into and down a tube 16. A low voltage power cable 86, which in the illustrated embodiment is a 12 volts dc power cable, runs from the controller box 82 to the foot control 90. The foot control 90 has a box shaped enclosure 92 with walls on five sides (open on one side). Foot pads 93 and 94 are mounted in the enclosure 92. The enclosure 92 also houses two levers, an air lever 96 and a motor reel lever 98. If the worker depresses the air lever 96 the normally closed valve 38 will be opened to direct air at, e.g. 300 psi, to the lance. If the worker 12 depresses the motor reel lever 98, then the motor 84 is activated to reel up or in the high-pressure air hose 62. A safety-wall 99 is Attached to the enclosure 92 between the air lever 96 and the motor reel lever 98. The safety-wall 99 extends to a height above the levers 96 and 98 but not from the bottom wall to the top wall of the enclosure 92. As such, a worker may simply move his or her foot from one lever to the other lever 96 or 98 without removing their foot from the enclosure 92. However the safety-wall 99 functions as a divider between the levers 96 and 98. This prevents the worker's foot from accidentally slipping from one lever to the other lever 96 or 98, and prevents activation of the reel and the air at the same time.

It is critical for an outer diameter of at least one cross section of the workstation 20 to be less than the inner diameter of the manway 14 for placing the workstation 20 within the vessel. For example, a vertical cross section taken through the seat 70, the drum and reel assembly 50 and the frame 56 perpendicular to the winding axis of the drum and reel assembly 50 (or through the arcuate handle 58 and frame 56) should have a diameter less that twenty inches (if necessary, the seat can be removed).

As there is no air motor placed in the vessel 10, no air motor lubricating oils will enter the manway 14. Such oils can kill or contaminate the activate of the catalyst.

While a foot control 90 has been illustrated and described, other types of controls, for example a hand control, could be used. Various communications lines, such as between the foot control 90 and the valves 38 and controller 82, could be established with a radio frequency transmitter and receiver so as to replace various lines, such as power cable 86. Battery power having sufficient power to energize various components of the system may also be implemented.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever form it may be utilized.

What is claimed is:

1. A method for removing a catalyst from a reactor vessel wherein the reactor vessel has a tube sheet mounted within the vessel at an upper end of a plurality of vertical reactor tubes also mounted within the vessel, and a manway above the tube sheet defining an opening to the vessel, comprising the steps of;

placing a workstation having a drum and reel assembly and a worker control assembly inside the vessel; and operating the workstation for removing the catalyst.

2. The method according to claim 1, wherein said step of placing the workstation inside of the vessel includes mounting the workstation on the tube sheet.

3. The method according to claim 1, further including converting a 110 volt power supply for the workstation to a low voltage supply outside the vessel.

4. The method according to claim 3, wherein said step of converting the 110 volt power supply for the workstation to the low voltage supply outside the vessel comprises converting the 110 volt power supply to a 12 volt DC power supply.

5. The method according to claim 3, further including running a low voltage line through the manway from the low voltage supply to the workstation.

6. The method according to claim 1, wherein said step of operating the workstation for removing the catalyst includes activating with one foot the drum and reel assembly and an air lance connected to the drum and reel assembly.

7. The method according to claim 1, wherein said step of operating the workstation for removing the catalyst includes sitting on a seat mounted on the workstation.

8. The method according to claim 7, further including rotating the seat.

9. The method according to claim 1, further including the step of mounting a seat on the workstation after said step of placing the workstation inside the vessel.

10. The method according to claim 9, wherein said step of operating the workstation for removing the catalyst includes sitting on the seat.

11. The method according to claim 10, further including rotating the seat.

* * * * *